Oct. 6, 1959
R. R. JOHNSON
2,907,877
ALGEBRAIC MAGNITUDE COMPARATORS
Filed May 18, 1954
2 Sheets-Sheet 1
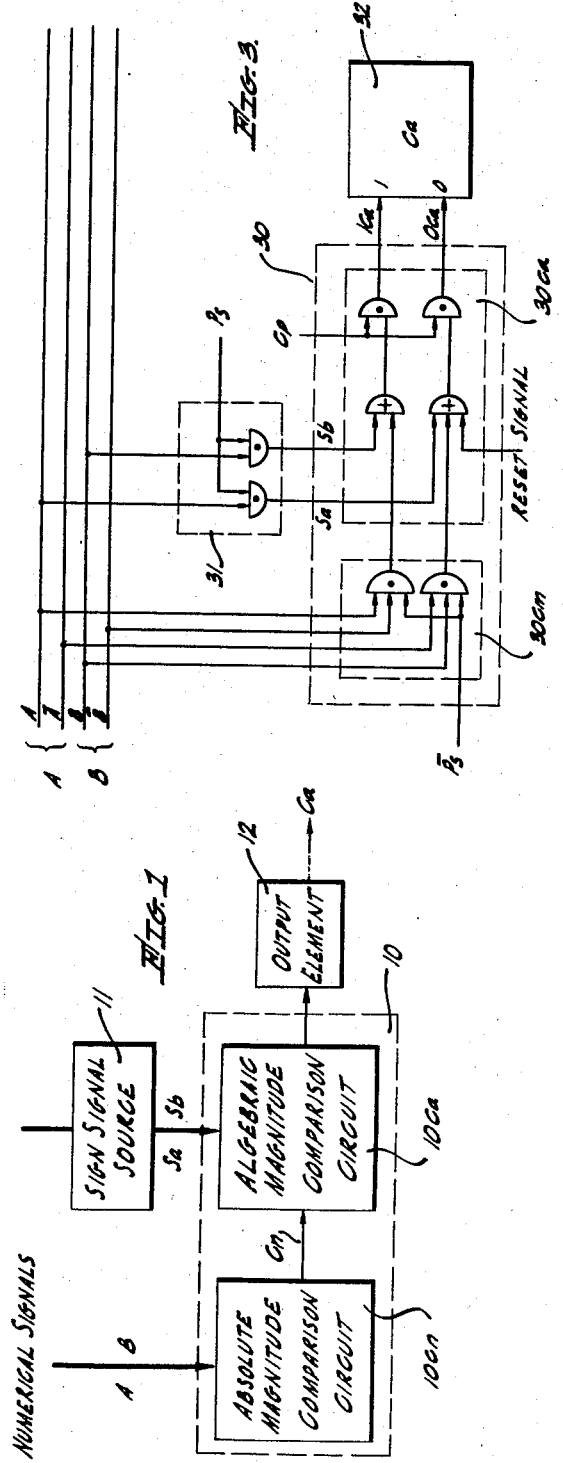
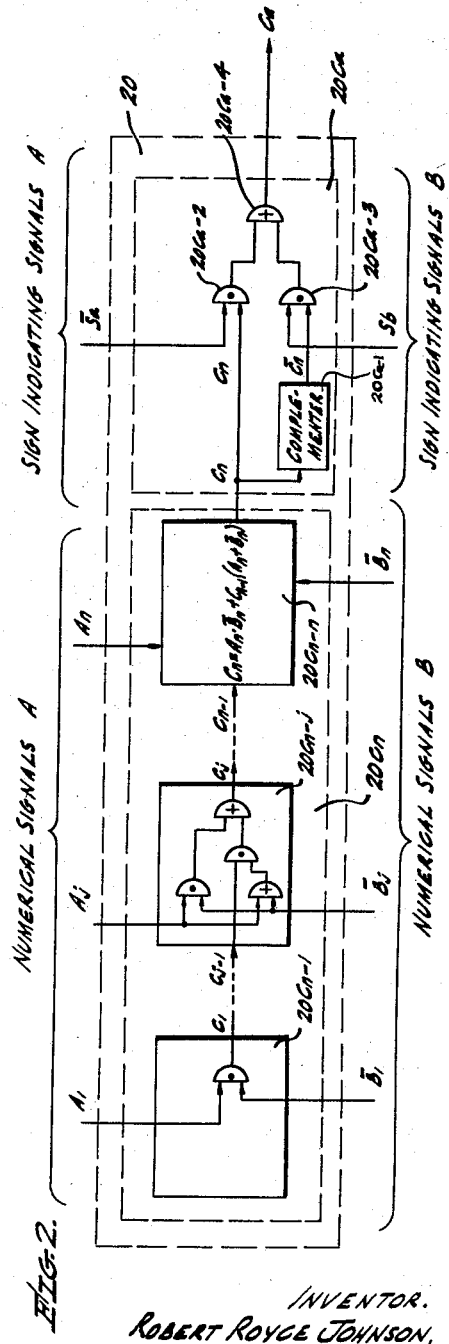
INVENTOR.
ROBERT ROYCE JOHNSON,
BY
*Lester S. Healy*
ATTORNEY.

Oct. 6, 1959   R. R. JOHNSON   2,907,877
ALGEBRAIC MAGNITUDE COMPARATORS
Filed May 18, 1954   2 Sheets-Sheet 2
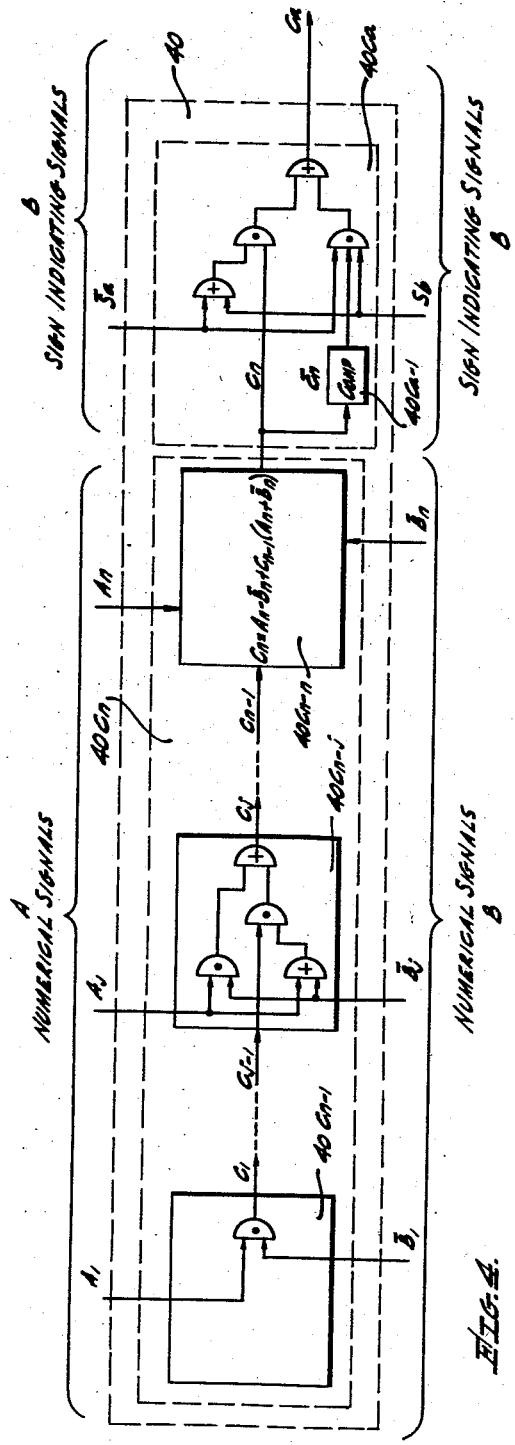
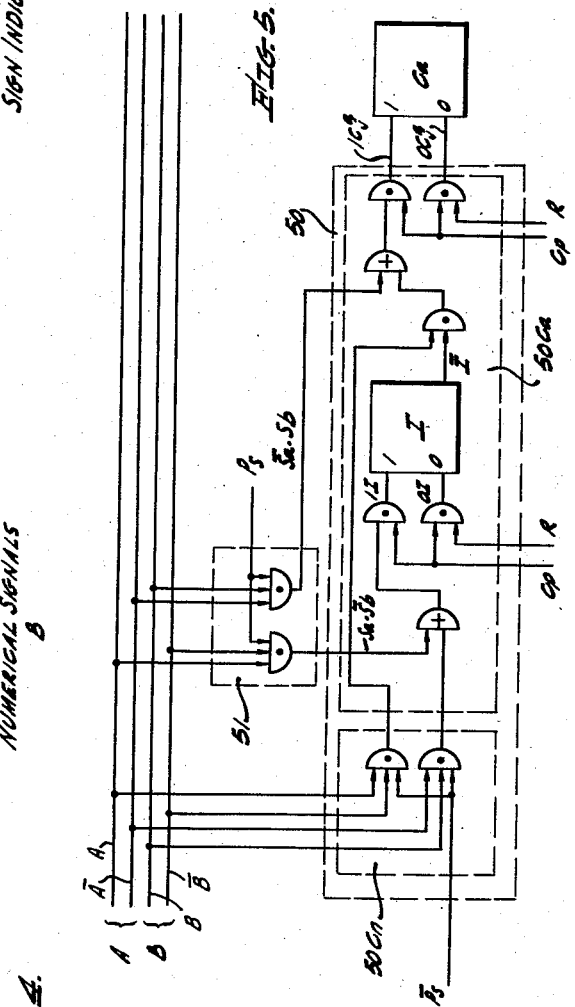
INVENTOR
ROBERT ROYCE JOHNSON,
BY
Lester S. Hecht
ATTORNEY

United States Patent Office 2,907,877
Patented Oct. 6, 1959

2,907,877

ALGEBRAIC MAGNITUDE COMPARATORS

Robert Royce Johnson, Altadena, Calif., assignor to Hughes Aircraft Company, Culver City, Calif., a corporation of Delaware Application May 18, 1954, Serial No. 430,531

19 Claims. (Cl. 250—27)

This invention relates to algebraic magnitude comparators, and more particularly to algebraic magnitude comparators for determining and indicating the relative magnitudes of two algebraic numbers by comparing the relative magnitudes of the corresponding digit and sign signals of the two numbers in an integrated operation.

Algebraic comparators as contemplated by the present invention are devices which are adapted to indicate the relative magnitudes of numbers where the signs of the numbers are considered as weighting factors. Thus, where algebraic numbers are of different signs, the algebraic comparator indicates that the positive number is the greater. And, if both numbers are negative the algebraic comparator indicates that the negative number having the smaller absolute magnitude is the greater.

An algebraic comparator of this type is particularly useful in obtaining the solution of many important economic, scientific, and purely mathematic problems. For example, such a comparator may be utilized in linear approximations utilizing the simplex method. In programming a computer for calculations according to the simplex method, pairs of algebraic numbers must be compared for their relative algebraic magnitudes as part of the solutional program.

In the past the direct comparison and indication of the relative magnitudes of two numbers has been limited to the comparison of the absolute magnitude of the numbers, no provision being made for the direct algebraic comparison of both positive and negative numbers. One method of comparing the absolute magnitudes of numbers has been to subtract one of the numbers from the other, and to determine their relative absolute magnitudes as a function of the sign of the differences resulting thereby. An alternative method, which is somewhat similar to this method, is to add the complement of one of the numbers to the other, the relative absolute magnitude then being indicated by the sign or sense of the sum. Both of these methods require an adder or subtracter circuit as well as an output element or indicating device.

An improved circuit for determining the relative absolute magnitude of two numbers is disclosed in copending U.S. patent application Serial No. 394,441 entitled "Electronic Magnitude Comparator" by Robert Royce Johnson, filed December 10, 1953. The basic principle of the Johnson comparator is that the relative absolute magnitudes of two numbers is dependent upon the relative absolute magnitudes of the most significant dissimilar corresponding digits of the two numbers. In the Johnson comparator, the corresponding binary digit signals of the two numbers are compared and the sense of the most significant corresponding dissimilar digital comparison placed in a bistable storage element; the state of the bistable element at the termination of the comparison indicating the relative absolute magnitudes of the two numbers.

In utilizing the available prior art absolute magnitude comparison circuits, it is necessary to perform separate operations to determine the relative absolute magnitude of the number and the relative sign magnitude of the numbers. Thus, where the addition or subtraction method is followed it is possible to obtain an algebraic comparison by utilizing the adder or subtracter and then analyzing the signs of the numbers which may be stored in separate bistable elements. The results of these two operations may then be compared in an output circuit which is additional structure in the computer. This method of obtaining algebraic comparison is unnecessarily complicated and introduces certain delays in obtaining the final comparison signal which may be undesirable.

The present invention overcomes the above and other disadvantages of utilizing separate prior art absolute magnitude comparators and sign storage devices by providing a class of algebraic comparators which may be simply mechanized in the form of a single gating matrix. Thus, parallel comparators are provided by the present invention wherein a signal indicating the relative algebraic magnitude of two numbers is produced in a single gating matrix. In a similar manner, serial comparators are provided wherein a very simple gating circuit is utilized to directly enter algebraic comparison signals into a bistable element.

In its basic structural form, the present invention comprises a logically mechanized gating matrix including a first gating circuit which produces an output signal $Cn$ indicating the relative absolute magnitude of input numbers A and B, and a second gating circuit responsive to signal $Cn$ and to signals $Sa$ and $Sb$, respectively indicating the signs of A and B, and directly producing a signal $Ca$ indicating the relative algebraic magnitude of the numbers A and B.

While many methods are known for representing algebraic numbers, only two are considered in the present specification in order to illustrate two corresponding classes of the invention. According to one method, each algebraic number is represented by its absolute magnitude plus a sign digit having a value for 0 and 1 for positive and negative numbers, respectively. This algebraic representation is hereinafter referred to as a sign-absolute-magnitude representation. Several methods of comparing algebraic numbers represented as sign-absolute-magnitudes are provided by the present invention; the methods varying according to the particular presentation of the numbers. The numbers may be presented in parallel, for example, or serially with the least significant digit first or most significant digit first.

Another method of representing algebraic numbers is to represent negative numbers as complements where a complement corresponds to the digital representation of the result when the number is subtracted from zero. This type of representation is hereinafter referred to as complemented-magnitude representation. The present invention provides several mechanizations for comparing the relative magnitude of numbers in a complemented-magnitude representation similar to those provided for numbers in a sign-absolute-magnitude representation.

The contribution of the present invention is particularly noticeable in the field of serial comparison. It will be shown that extremely simple algebraic serial comparators may be obtained according to principles described below.

Accordingly it is an object of the present invention to provide an algebraic comparator for directly determining and indicating the relative magnitudes of two algebraic numbers.

Another object of the invention is to provide an algebraic comparator for indicating the relative magnitude of algebraic numbers which requires only a single gating matrix, obviating the necessity of an adder or subtracter and additional bistable elements for storing signs of the numbers.

A further object of the invention is to provide an algebraic comparator for determining and indicating the relative magnitude of numbers in a sign-absolute-magnitude representation.

Yet another object of the invention is to provide an algebraic comparator for determining and indicating the relative magnitude of numbers in a complemented-magnitude representation.

A still further object of the invention is to provide parallel algebraic comparators for indicating the relative algebraic magnitude of numbers in a single gating matrix.

An additional object of the invention is to provide serial algebraic comparators for indicating the relative magnitude of algebraic numbers, the comparator requiring a simple gating circuit for entering signals into a bistable element.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 1 is a block diagram of an algebraic comparator according to the present invention;

Fig. 2 is a schematic diagram of a parallel algebraic comparator for comparing and indicating the relative magnitude of two algebraic numbers, each number being represented as an absolute magnitude and sign;

Fig. 3 is a schematic diagram of a serial algebraic comparator, defined by the same basic functions as the comparator of Fig. 2, wherein the numbers are represented by signals serially received in the order of the least significant numerical digits first and sign last;

Fig. 4 is a schematic diagram of a parallel algebraic comparator for comparing and indicating the relative magnitudes of two algebraic numbers, each negative number being represented by its complement; and Fig. 5 is a schematic diagram of a serial algebraic comparator, defined by the same basic functions as the comparator of Fig. 4, where the numbers are represented by signals serially received in the order of the least significant numerical digits last and sign first.

Reference is now made to Fig. 1 wherein there is shown a block diagram of the basic structural form of an algebraic comparator 10 according to the present invention. As shown in Fig. 1, comparator circuit 10 includes an absolute magnitude comparison circuit 10Cn which responds to input signals representing numbers A and B and produces an output signal $Cn$ indicating the relative absolute magnitudes of numbers A and B. The signal $Cn$ may be considered to be the $n$th or last comparison in a series of absolute magnitude comparisons in the various digit positions. In addition, comparator 10 also includes an algebraic magnitude comparison circuit 10Ca which receives signal $Cn$ and sign indicating signals $Sa$ and $Sb$ produced by a source 11 and produces output signals which may be utilized to actuate an output element 12 to produce a comparison signal $Ca$ indicating the relative algebraic magnitudes of numbers A and B.

It should be understood at the outset, however, that output element 12 is utilized in conjunction with comparator 10 only where the comparator of the present invention is adapted to receive the input signals representing numbers A and B in a serial fashion. As will become apparent from the ensuing discussion, where the input signals representing numbers A and B are received by comparator 10 in a parallel fashion, i.e., all input signals of numbers A and B received simultaneously, output element 12 is eliminated and the output signals produced by comparator 10 directly represent signal $Ca$.

Before describing the specific forms of algebraic comparators which are defined by the present invention and illustrated in the generic block diagram of Fig. 1, it is helpful to first introduce the basic concepts of the present invention relating to a novel method of comparing algebraic numbers expressed as binary digits.

The relative numerical magnitude, disregarding the signs, of two numbers represented by two sets of weighted binary digits, is a function of the relative magnitudes of the corresponding binary digits representing the two numbers. For purposes of this discussion, it is assumed at the outset that a binary 1 represents a greater digit magnitude than a binary 0, expressed by the absence and presence, respectively, of a bar over the binary digit symbol. Letting the subscript $j$ represent a binary-digit position the relative magnitudes of two corresponding binary digits of numbers A and B, respectively, may then be expressed as:

$$A_j > B_j \text{ if } A_j.\bar{B}_j$$
$$A_j < B_j \text{ if } \bar{A}_j.B_j$$
$$A_j = B_j \text{ if } A_j.B_j + \bar{A}_j.\bar{B}_j$$

where the dot (.) represents the logical "and" and the plus (+) the logical "or" according to the principles of Boolean logic.

For discussion purposes, it may be assumed that the corresponding numerical digits of numbers A and B are considered in the order of ascending significance and that the binary digits representing each numerical digit are considered in the order of ascending weights. The relative numerical magnitudes of the two numbers is dependent upon the relative magnitudes of the most significant dissimilar corresponding binary digits compared. Let it be assumed that the result of the numerical magnitude comparison process is represented by a binary signal $Cn$ having a 1-representing level when the aggregate of the binary digits compared indicates that A is greater than B and having a 0-representing state if the aggregate indicates that A is less than or equal to B. Thus, the value of signal $Cn$ indicates the relative numerical magnitudes of numbers A and B in the following manner:

If $A > B$, then $Cn = 1$

If $A < B$, then $Cn = 0$

If $A = B$, then $Cn = 0$

The value $C_j$, of $Cn$ at any binary digit place, as a function of the binary digits in the binary digital place and the value $C_{j-1}$ of $Cn$ in the preceding binary place, may then be derived from the following truth table.

Table I

| $A_j$ | $B_j$ | $C_{j-1}$ | $C_j$ |
|---|---|---|---|
| 0 | 0 | 0 | 0 |
| 0 | 1 | 0 | 0 |
| 1 | 0 | 0 | 1 |
| 1 | 1 | 0 | 0 |
| 0 | 0 | 1 | 1 |
| 0 | 1 | 1 | 0 |
| 1 | 0 | 1 | 1 |
| 1 | 1 | 1 | 1 |

From Table I, the function for $C_j$ may be written as follows:

$$C_j = A_j.\bar{B}_j + C_{j-1}.(A_j + \bar{B}_j)$$

As previously noted there are two general methods of representnig algebraic numbers in a computer system herein considered; sign-absolute-magnitude representation and the complemented-magnitude representation.

Considering first the sign-absolute-magnitude representation, the relative numerical magnitudes of numbers A and B may be expressed as a function $Ca$ of the relative numerical magnitude $Cn$ and the signs of the numbers, $Sa$ and $Sb$. For example, if both numbers are negative, the number having the lesser numerical magnitude has the greater true algebraic magnitude. Similarly, if one is positive and the other negative, the positive number is algebraically the larger.

The true algebraic relative magnitudes of numbers A and B, covering all possible conditions, may be represented in a truth table, such as Table II below, where it is assumed that the sign comparison is performed as a function of the total relative numerical magnitudes of A and B. In the table, $Cn$ represents the results of the numerical comparisons or the $n$th comparison, $Sa$ and $Sb$ represent the algebraic sign of numbers A and B, respectively, and $Ca$ represents the true algebraic relation of numbers A and B as a function of $Cn$, $Sa$, and $Sb$. Numerical magnitude comparison signal $Cn$ has a binary 1 value when the numerical magnitude of A is greater than the numerical magnitude of B, and has a binary 0 value when the numerical magnitude of A is less than or equal to the magnitude of B. In accordance with convention, a positive and a negative algebraic sign is represented by a 0-representing and a 1-representing sign signal, respectively. Thus sign representing signal $Sa$ has a binary 0 value when input number A is positive, and has a binary 1 value when A is negative. Similarly, sign representing signal $Sb$ has values of 0 and 1, respectively, when input number B is positive and negative. In the table, $Ca$ has a binary 1 value when the true algebraic magnitude of A is greater than the true algebraic magnitude of B, and a binary 0 value when the true algebraic magnitude of A is less than or equal to the algebraic magnitude of B.

*Table II*

| Sa | Sb | Cn | Ca |
|----|----|----|----|
| 0  | 0  | 0  | 0  |
| 0  | 1  | 0  | 1  |
| 1  | 0  | 0  | 0  |
| 1  | 1  | 0  | 1  |
| 0  | 0  | 1  | 1  |
| 0  | 1  | 1  | 1  |
| 1  | 0  | 1  | 0  |
| 1  | 1  | 1  | 0  |

From Table II, the function for $Ca$ may be written:

$$(20Ca) \quad Ca = Cn.\bar{S}a + \bar{C}n.Sb$$

where $Cn$ represents the value of $C_j$ in the $n$th digit place $(j=n)$.

$$(20Cn) \quad C_j = A_j.\bar{B}_j + C_{j-1}.(A_j + \bar{B}_j)$$

Referring now to Fig. 2, there is shown a parallel algebraic comparator 20 mechanized according to the above principles for comparing two algebraic numbers A and B, represented by numerical binary signals $A_1, \ldots A_j, \ldots A_n$ and $B_1, \ldots B_j, \ldots B_n$, respectively, and sign binary signals $Sa$ and $Sb$, respectively. As shown in Fig. 2, the comparator 20 comprises an absolute magnitude comparison circuit 20Cn and an algebraic magnitude comparison circuit 20Ca. The absolute magnitude comparison circuit 20Cn produces a relative numerical magnitude signal $Cn$ in response to the numerical binary signals $A_1, \ldots A_j, \ldots A_n$ and $B_1, \ldots B_j, \ldots B_n$, and the algebraic magnitude comparison circuit 20Ca, in response to the numerical magnitude signal $Cn$ and the sign signals $Sa$ and $Sb$, produces a binary signal $Ca$ representing the relative magnitudes of numbers A and B.

The absolute magnitude comparison circuit 20Cn may be considered as including $n$ logical gating circuits, 20Cn—1, ... 20Cn—j, ... 20Cn—n, where $n$ represents the number of numerical binary digit places in each of the algebraic numbers A and B. Each of the above logical gating circuits may be mechanized in accordance with the logical expression (20Cn) derived above, which applied to any binary digital position. Thus, the logical gating circuit 20Cn—j is mechanized in accordance with the equation, $$(20Cn—j) \quad C_j = A_j.\bar{B}_j + C_{j-1}.(A_j + \bar{B}_j)$$

and the logical gating circuit 20Cn—n in accordance with the equation:

$$(20Cn—n) \quad C_n = A_n.\bar{B}_n + C_{n-1}.(A_n + \bar{B}_n)$$

It is evident that the logical expressions for each of the logical gating circuits included in the comparison circuit 20Cn are similar with the exception of the logical expression for the 20Cn—1 gating circuit, which is mechanized in accordance with the expression:

$$(20Cn—1) \quad C_1 = A_1.\bar{B}_1$$

where the $C_{j-1}$ term is nonexistent.

The algebraic magnitude comparison circuit 20Ca for producing the $Ca$ signal is mechanized in accordance with the logical expression (20Ca) derived above. In order to provide the complementary signal $\bar{C}n$ required in the above expression, a level complementing circuit 20Ca—1 is provided in the algebraic comparison circuit 20Ca.

Each of the "and" functions in the above equations is provided in Fig. 2 with an "and" circuit which responds to signals applied to separate input terminals and produces 1-representing output signals only when all input signals are 1-representing signals. Thus, the "and" function $Cn.\bar{S}a$ in the mechanizing function (20Ca) above is provided with an "and" circuit 20Ca—2 in the logical gating circuit 20Ca of Fig. 2, which responds to signals $Cn$ and $\bar{S}a$ and produces a 1-representing output signal when both $Cn$ and $\bar{S}a$ are 1-representing signals. Similarly the "and" circuit 20Ca—3 responds to separately applied input signals to produce 1-representing output signals defined by the corresponding "and" function in Equation 20Ca above.

Each of the "or" functions in the above equation is provided by an "or" circuit responding to separately applied input signals for producing a 1-representing output signal when any one or more of the input signals is in a 1-representing state. Thus, the "or" function $$Cn.\bar{S}a + \bar{C}n.Sb$$

of Equation 20Ca above is provided with an "or" circuit 20Ca—4 in the algebraic magnitude comparison circuit 20Ca of Fig. 2, which responds to separately applied input signals $Cn.\bar{S}a$ and $\bar{C}n.Sb$ and produces a 1-representing output signal $Ca$ when either one or both of the input signals is a 1-representing signal.

It is evident from the manner employed in deriving the general function (20Ca) from Table II above, that the function for $Ca$ is independent of the manner employed for determining the values of the individual terms $Cn$, $\bar{C}n$, $Sa$, and $Sb$. For example, the relative numerical magnitudes of the numbers A and B, represented by signal $Cn$, may be obtained by either a parallel or serial comparison of the corresponding numerical binary digits. If the corresponding numerical binary digits are serially compared in the order of ascending weights or significants, then the value of $Cj$, representing the value of $Cn$ at any binary digit place, may be expressed by the logical function:

$$C_j = A_j.\bar{B}_j + C_{j-1}.(A_j + \bar{B}_j)$$

previously derived from Table I above. Since the above expression requires the value $C_{j-1}$ of $Cn$ in the preceding place, the value of $C_j$ for each binary digit place must be stored in a storage element, such as a flip-flop, for one binary digit time interval. If the sign signals $Sa$ and $Sb$ of the expression (20Ca) above are received after the final value, $Cn$, of $C_j$ is determined and stored in the storage element, then the value for $Cn$ will be available from the storage element at the same time that the sign signals $Sa$ and $Sb$ are available.

Referring now to Fig. 3 there is shown a serial algebraic comparator 30 mechanized according to the above principles for comparing algebraic numbers A and B represented by two sets of numerical complementary binary signals A, $\bar{A}$ and B, $\bar{B}$, respectively, and sign signals $Sa$ and $Sb$, respectively; each of the algebraic numbers being received in the order of least significant numerical digit first and sign last, and negative numbers being represented by their absolute magnitudes and negative signs. As shown in Fig. 3, the algebraic comparator circuit 30 is comprised of an absolute magnitude comparison circuit 30Cn and an algebraic comparison circuit 30Ca. As shown in the figure, the absolute magnitude circuit 30Cn produces a pair of numerical comparison signals representing the value of $Cn$, in response to the A, $\bar{A}$, B, and $\bar{B}$ signals and a binary signal $\bar{P}s$ which is in a 1-representing state during reception of numerical digit signals and in a 0-representing state during reception of the sign signals. The algebraic circuit 30Ca, in response to the numerical comparison signals, a reset signal R, clock pulses $Cp$, and the sign signals $Sa$ and $Sb$, produces a pair of binary control signals $1Ca$ and $0Ca$, respectively, representing $Ca$.

It is noted that the output element 12 of Fig. 1 is a flip-flop $Ca$ having separate 1 and 0 input circuits responsive to the binary control signals $1Ca$ and $0Ca$, respectively. Therefore before considering the specific mechanization of the logical circuits 30Cn and 30Ca of Fig. 3, it is necessary to consider the general form of equations defining the input functions for flip-flops. The discussion here is brief since the theory of flip-flop control functions is discussed in considerable detail in copending U.S. patent applications Serial No. 327,567 for "Binary-Coded Flip-Flop Counters" by Eldred C. Nelson, filed December 23, 1952, now Patent No. 2,816,223, and Serial No. 327,131 for "Binary-Coded Flip-Flop Counters" by Robert Royce Johnson, filed December 20, 1952, now Patent No. 2,853,238.

Although flip-flop C of Fig. 3 is represented as a conventional flip-flop having 1 and 0 input circuits, such that pulses applied to the 1 and 0 circuits set the flip-flop to the 1 and 0 states, respectively, it should be understood that, by a slight alteration of the algebraic circuit 30Ca, other types of flip-flops may be used, such as an "overriding" flip-flop, which is set to its 0-representing state during each binary digit time interval when a pulse is not applied to the 1 input circuit.

As is more fully explained in the above copending applications, three general types of flip-flop input functions may be utilized to control the sequence of stable states of an associated flip-flop. According to one type of equation, the sequence of stable states of the flip-flop is directly defined so that the value of the equation (1 or 0) at a particular time indicates the next flip-flop setting. This type of function may be referred to as a "setting" function. When a setting function is utilized, the flip-flop must be an "overriding" flip-flop of the type just described, or a complementer circuit must be introduced to translate the gating output signal into complementary signals.

According to a second type of defining equation, the conditions for changing the flip-flop stable state, or triggering the flip-flop, are established. When this type of mechanization is utilized, a conventional flip-flop is employed and the gating circuit signal is applied to both the 1 and 0 input circuits of the flip-flop. In many situations, the changing type of equation may be separated into two partial-changing equations, separately defining the conditions for changing the associated flip-flop stable state from 0 to 1 and from 1 to 0. The partial-changing functions are particularly useful where the equations include the output signals of the flip-flop to be controlled. In this case, the partial-changing functions may be simplified according to rules briefly considered below which are fully described in the above-mentioned copending applications to Nelson and Johnson. The "setting," "changing," and "simplified partial-changing" functions for controlling a flip-flop $Fk$ ($k$ representing any flip-flop) are designated, respectively, by the notations: $toFk=$; $1Fk=0Fk=$; and $1Fk=$, $0Fk=$.

As is more fully explained in the above-mentioned copending applications to Nelson and Johnson, any flip-flop function may be written in the form:

$$toFk = \bar{F}^k \cdot G + F^k \cdot \bar{H}$$

$F^k$ and $\bar{F}^k$ representing the complementary output signals of flip-flop $Fk$. This may be reduced to the simplified partial-changing functions:

$$1Fk = G$$
$$0Fk = H$$

G and H being any functions of variables other than $F^k$ and $\bar{F}^k$.

Since the absolute magnitude comparison of numbers A and B is performed before the signs are compared, the absolute magnitude comparison and the algebraic or sign comparison may be considered as two separate, consecutive processes, i.e., an absolute magnitude comparison process followed by an algebraic comparison process. Thus the expression (20Cn) derived from Table II above may be modified, by including the binary signal $\bar{P}s$ as an "and" function, to form a numerical or absolute magnitude comparison function as:

$$C_j = \bar{P}s[A_j \cdot \bar{B}_j + C_{j-1} \cdot (A_j + \bar{B})]$$

where the final value for $C_j$ at the termination of the numerical comparison represents the value for $Cn$.

The algebraic or sign comparison of the numbers A and B may then be expressed in accordance with the general function (20Ca) above derived from Table II as a function of the result $Cn$ of the numerical comparison and the algebraic signs of the numbers indicated by the sign signals $Sa$ and $Sb$. By substituting the term $C_{j-1}$ for $Cn$, $\bar{C}_{j-1}$ for $\bar{C}n$ in the expression for $Ca$, and including the binary signal $Ps$ as an "and" function, the algebraic comparison function becomes:

$$Ps \cdot (C_{j-1} \cdot \bar{A}_j + \bar{C}_{j-1} B_j)$$

Since the numerical comparison of the numbers A and B is completed before the sign or algebraic comparison is performed, the above numerical and algebraic comparison functions may be logically added to form a setting function for flip-flop $Ca$ as follows:

$$toCa = \bar{P}s \cdot [A_j \cdot \bar{B}_j + C_{j-1} \cdot (A_j + \bar{B}_j)]$$
$$+ Ps \cdot (C_{j-1} \cdot \bar{A}_j + \bar{C}_{j-1} \cdot B_j)$$
$$= C_{j-1} \cdot [\bar{P}s \cdot (A_j + \bar{B}_j) + Ps \cdot \bar{A}_j]$$
$$+ \bar{C}_{j-1} \cdot [\bar{P}s \cdot A_j \cdot \bar{B}_j + Ps \cdot B_j]$$

where the complementary signals $Ps$ and $\bar{P}s$ are added to identify the sign and numerical binary signals, respectively. The above setting function may be written in the form of simplified partial-changing functions as:

$$1Ca = \bar{P}s \cdot A_j \cdot \bar{B}_j + Ps \cdot B_j$$
$$0Ca = \bar{P}s \cdot (A_j + \bar{B}_j) + Ps \cdot \bar{A}_j = \bar{P}s \cdot \bar{A}_j \cdot B_j + Ps \cdot A_j$$

The above equations may be written in the form of mechanization functions for the comparator circuit 30 of Fig. 3 as follows:

$$(30) \quad 1Ca = (\bar{P}s \cdot A_j \cdot \bar{B}_j + Sb) \cdot Cp$$
$$0Ca = (\bar{P}s \cdot \bar{A}_j \cdot B_j + Sa + R) \cdot Cp$$

where the sign signals $Sa$ and $Sb$ are substituted for signals $Ps \cdot A_j$ and $Ps \cdot B_j$, respectively, where the "reset" signal R is introduced for initially setting the flip-flop $Ca$ to the 0-representing state, and the signal $Cp$ is introduced to indicate a synchronizing "and" condition, signal $Cp$ occurring once each binary-digit time interval. The sign signals $Sa$ and $Sb$ are separately generated by a sign signal circuit 31 mechanized according to the functions:

(31)
$$Sa = Ps.A_j$$
$$Sb = Ps.B_j$$

Each of the "and" and "or" functions in the above mechanization equations is provided with an "and" or "or" circuit in the comparator of Fig. 3, and in the light of previous mechanization procedure, no further explanation is deemed necessary.

Considering next the complemented-magnitude representation of algebraic numbers, wherein negative numbers are represented by the complement of the number derived when the number is subtracted from zero, a general function for $Ca$ may be derived from Table III below where the values of $Ca$ for all possible combinations of $Cn$, $Sa$, and $Sb$ are presented.

Table III

| Sa | Sb | Cn | Ca |
|----|----|----|----|
| 0 | 0 | 0 | 0 |
| 0 | 1 | 0 | 1 |
| 1 | 0 | 0 | 0 |
| 1 | 1 | 0 | 0 |
| 0 | 0 | 1 | 1 |
| 0 | 1 | 1 | 1 |
| 1 | 0 | 1 | 0 |
| 1 | 1 | 1 | 1 |

Table III was derived in the following manner. All possible combinations of values for $Sa$ and $Sb$ are first written under their respective columns, i.e., 00, 01, 10, and 11. A zero is then inserted in the $Cn$ column for each of the above combinations of values. Values of 00, 01, 10, and 11 for $Sa$ and $Sb$ are then repeated in the same order and a 1 inserted in the $Cn$ column opposite each repeated combination. In this manner all possible combinations of values for variables $Sa$, $Sb$, and $Cn$ are included in the table. The correct value for $Ca$ is then determined for each combination of variables $Sa$, $Sb$, and $Cn$ and inserted in the $Ca$ column in the corresponding row of the table. This is accomplished by first inserting the same value in the $Ca$ column as in the $Cn$ column for each row wherein both numbers A and B are positive numbers. This is permissible because the algebraic relative magnitude of two positive numbers is equal to the numerical relative magnitude of the numbers. Thus $Ca$ is equal to $Cn$ when both $Sa$ and $Sb$ have values of 0, i.e., $Ca$ is equal to 0 when $Sa$, $Sb$, and $Cn$ are each equal to 0, and $Ca$ is equal to 1 when $Sa$ and $Sb$ are both 0 and $Cn$ is equal to 1.

As between two numbers having different signs, the positive number has a relative algebraic magnitude greater than the negative number regardless of the relative absolute or numerical magnitudes of the two numbers. Thus in each row of the table where the values of $Sa$ and $Sb$ differ, the value for $Ca$ is determined independently of the value for $Cn$ and is inserted as a 0 when $Sa$ is 1, and conversely as a 1 when $Sa$ is 0. This leaves for determination the value for $Ca$ when both input numbers are negative, i.e., when both $Sa$ and $Sb$ have values of 1.

Since in the complemented-magnitude representation of algebraic numbers, a negative number is represented by the complement of the absolute magnitude of the number, two negative numbers of dissimilar absolute magnitude will have a true relative numerical magnitude opposite in sense to the relative numerical magnitude indicated by signal $Cn$. However, since the true algebraic relative magnitude of two negative numbers is opposite in sense to the relative numerical magnitude of the numbers, the true algebraic relative magnitude of the two numbers is directly indicated by the value of signal $Cn$. For example, if the absolute magnitude of a negative number A is greater than the absolute magnitude of a second negative number B, then a comparison of the complements of the numbers will indicate that the absolute magnitude of B is greater than A as indicated by a 0 value for $Cn$. Since both A and B are negative, however, the number B has a true algebraic magnitude greater than the number A, which is represented by a 0 value for $Ca$. In each case when both $Sa$ and $Sb$ are 1 in the table, therefore, the value for $Ca$ is inserted as equal to the corresponding value for $Cn$.

From Table III above, function for $Ca$ may be written as follows:

$$Ca = Cn.(\bar{S}a + Sb) + \bar{C}n.\bar{S}a.Sb$$

Reference is now made to Fig. 4, where there is schematically presented a parallel algebraic comparator 40 mechanized according to the above principles for comparing algebraic numbers A and B, represented by numerical binary signals $A_1, \ldots, A_j, \ldots A_n \ldots$ and $B_1, \ldots B_j, \ldots B_n$; respectively, and sign signals $Sa$ and $Sb$, respectively. As shown in the figure, the algebraic comparator 40 comprises an absolute magnitude comparison circuit 40Cn which produces binary signals $Cn$ as a function of signals $A_1, \ldots A_j, \ldots A_n$ and $B_1, \ldots B_j, \ldots B_n$, and an algebraic magnitude comparison circuit 40Ca which receives signals $Cn$ and the sign signals $Sa$ and $Sb$ and produces a binary signal $Ca$ representing the true algebraic relationship of numbers A and B.

It will be noted that the absolute magnitude comparison circuit 40Cn is similar to the absolute magnitude comparison circuit 20Cn of Fig. 2 in that it is comprised of a series of subcircuits 40Cn—1, ... 40Cn—j, ... 40Cn—n, ... each mechanized according to the logical expression, (40Cn)
$$C_j = A_j.\bar{B}_j + C_{j-1}.(A_j + \bar{B}_j)$$

The algebraic comparison circuit 40Ca is mechanized in accordance with the following logical expression for $Ca$ derived from Table III above:

(40Ca)
$$Ca = Cn.(\bar{S}a + Sb) + \bar{C}n.\bar{S}a.Sb$$

Since the above expression requires the complement $\bar{C}n$ of the signal $Cn$ generated by the numerical comparison circuit 40Cn, a level complementing circuit 40Ca—1 is included in the algebraic comparison circuit 40Ca of Fig. 4. Each "and" and "or" function appearing in the above logical equations is provided with an "and" and "or" gating circuit, respectively, in the circuit of Fig. 4, and in light of the previous discussions on the mechanization of logical equations, no further detailed discussion of Fig. 4 is considered necessary.

If the corresponding numerical binary digits of numbers A and B are serially compared in the order of descending weights or significance, then the logical expression for $C_j$, derived from Table I above, will no longer apply since the value of $C_j$ will be dependent upon the first dissimilar corresponding numerical digits compared. In order to obtain a function for $C_j$ under these conditions, an inhibiting term must be incorporated in the function for $C_j$ which will inhibit comparisons following the first dissimilar corresponding numerical digits compared. If a binary signal $I$ is in a 1-representing state when the most significant dissimilar corresponding binary digits of numbers A and B indicate that A is numerically less than B, and in a 0-representing state under all other conditions, the function for $C_j$ may be expressed in terms of its previous value, $C_{j-1}$, in the preceding binary digit place, as follows:

$$C_j = C_{j-1} + A_j.\bar{B}_j.I$$

If the signs are received after the numerical digits of the numbers are compared, the function for the algebraic relative magnitudes, $C_j^a$, of A and B, may be obtained by logically adding the term $\bar{S}a.Sb$, indicating that A is positive and B negative, to the above expression. When the signs of the numbers precede the numerical digits, the inhibiting term, I, must be expanded to include the term $Sa.\bar{S}b$, thus giving the expression:

$$I = \bar{A}_j.B_j + Sa.\bar{S}b$$

for the inhibiting term I; and the function for $C_j^a$ then becomes:

$$C_j^a = C_{j-1} + \bar{S}a.Sb + A_j.\bar{B}_j.I$$

If the signals I and $C_j^a$ are applied to flip-flops I and Ca, respectively, which are initially set to the zero state by a reset signal R, the above functions may be written in the form of the simplified partial-changing functions:

$$(50Ca) \begin{cases} 1I_j^a = (\bar{A}_j.B_j.\bar{P}s + Sa.\bar{S}b).Cp \\ 0I = R.Cp \\ 1C_j^a = (A_j.\bar{B}_j.\bar{P}s.\bar{I} + \bar{S}a.Sb).Cp \\ 0C_j^a = R.Cp \end{cases}$$

where the signal $\bar{P}s$ is a 1-representing binary signal during reception of the numerical digits of numbers A and B, and is a 0-representing signal during reception of the sign signals of the numbers.

Reference is now made to Fig. 5 wherein there is presented an algebraic comparator 50 for serially determining and indicating the relative magnitudes of two algebraic numbers A and B represented, respectively, by binary input signals $A_j$, $\bar{A}_j$, and $B_j$, $\bar{B}_j$; each number being received in the order of sign signal first and least significant numerical digit signal last. As shown in the figure, the comparator 50, in response to signals $A_j$, $\bar{A}_j$, $B_j$, and $\bar{B}_j$, sign signals $Sa.\bar{S}b$ and $\bar{S}a.Sb$ produced by a sign signal circuit 51, a reset binary signal R, and a synchronizing pulse Cp, produces a pair of binary control signals $1C_j^a$ and $0C_j^a$ representing the relative magnitudes of the algebraic numbers A and B. The sign signals $Sa.\bar{S}b$ and $\bar{S}a.Sb$ are produced by the sign circuit 51 as a function of the $A_j$, $\bar{A}_j$, $B_j$, $\bar{B}_j$ signals and a sign position signal Ps which is in a 1-representing state during reception of sign indicating binary signals $A_j$, $\bar{A}_j$, $B_j$ $\bar{B}_j$, and in a 0-representing state during reception of numerical digit representing $A_j$, $\bar{A}_j$, $B_j$ $\bar{B}_j$, signals. The comparator 50 includes an absolute magnitude comparison circuit 50Cn which produces a pair of binary numerical comparison signals, in response to the $A_j$, $\bar{A}_j$, $B_j$, $\bar{B}_j$, and $\bar{P}s$ signals, and an algebraic comparison circuit 50Ca which produces the binary control signals $1C_j^a$ and $0C_j^a$ as a function of the binary numerical comparison signals, sign signals $Sa.\bar{S}b$ and $\bar{S}a.Sb$, reset signals R, and the synchronizing pulses Cp. It is noted that the output element 12 of Fig. 1 is herein presented as a flip-flop Ca having 1 and 0 input circuits responsive to $1C_j^a$ and $0C_j^a$ signals, respectively.

The absolute magnitude comparison circuit 50Cn is similar to the absolute magnitude comparison circuit 30Cn of Fig. 3, and needs no further explanation. The algebraic comparison 50Ca, which includes a flip-flop I having 1 and 0 input circuits responsive to a pair of control signals 1I and 0I, respectively, is mechanized in accordance with the logical mechanization Equations 50Ca above, and in light of previous discussions on the mechanization of logical equations, further explanation is deemed unnecessary.

From the foregoing discussion it is apparent that the present invention provides an algebraic comparator for directly determining and indicating the relative magnitudes of two algebraic numbers represented by two sets of binary digit signals. Species of the invention have been described in detail for directly determining and indicating the relative magnitudes of numbers in a sign-absolute-magnitude representation and a complemented-magnitude representation. In addition, embodiments of the invention have been described in detail for both the parallel and serial operation. Although the serial embodiments of the present invention described in detail have been operable upon algebraic numbers received in two sequences or orders, that is, least significant numerical digits first and sign last, and signs first and least significant numerical digits last, it will be understood that a considerable variety of serial mechanizations are possible. For example, other serial embodiments described may be utilized, with minor changes, in a system wherein each algebraic number is received in the order of most significant numerical digit first and sign last, or sign first and most significant numerical digit last, either in a sign-absolute-magnitude or complemented-magnitude representation. It should also be understood that although the serial and parallel embodiments of the present invention have been described as operating in a sign-absolute-magnitude and complemented-magnitude representation, the algebraic comparator of the present invention is readily adaptable to any algebraic number system wherein the signs of the algebraic numbers are discernible by binary signals.

Although the present invention has been described in relation to binary electrical pulses, it should be apparent that the principles herein taught are equally applicable to any two-condition signal system such as mark space, symmetrical wave, or carrier modulation system. It should be further apparent that the present invention is not limited to purely binary number systems but is equally operable with any binary-digit coded system such as the binary-coded decimal system, the binary-coded octal system, and the like.

The embodiments herein described utilize electrical signals, electrical gates, and electronic flip-flops, but it should be clearly understood that the principles herein taught are equally applicable to electro-mechanical, mechanical, hydraulic, or chemical components having unidirectional features, two stable states, and storage capacity.

What is claimed as new is:

1. A comparator for receiving two pluralities of input signals representing the complemented magnitudes of two negative algebraic numbers and representing the negative signs of the two numbers and for producing an output signal indicating the relative magnitudes of the numbers, including, numerical comparison means including a plurality of "and" and "or" networks connected in a particular interrelationship for response to the numerical signals in the first and second series to produce a first plurality of signals representing the comparison of successive digits in the numbers and to produce the comparison signals for each particular digit in accordance with the comparison provided for the previous digit and the values of the input numbers for the particular digit and to produce a control signal representing the results of the numerical comparison in the successive digits of the numbers, and algebraic comparison means coupled to said numerical comparison means and including a plurality of "and" and "or" networks connected in a particular interrelationship for response to said signals from said numerical comparison means and to the signals representing the negative signs of the input numbers to produce an output signal indicating the relative algebraic magnitudes of the two numbers directly in accordance with the characteristics of said control signal.

2. A comparator for serially receiving two pluralities of input signals representing the magnitudes of two algebraic numbers and representing the algebraic signs of the two numbers and for producing an output signal representing the relative algebraic magnitudes of the numbers, comprising: input signal circuits for serially presenting the input signals representing the magnitudes of the numbers and for presenting the input signals representing the signs of the numbers, timing signal circuits presenting number timing signals during the presentation of the input signals representing the magnitudes of the numbers and presenting sign timing signals during the presentation of the input sign signal circuits coupled to said input signal circuits and said timing signal circuits for producing sign signals during the period of presentation of said sign timing signals, numerical comparison means coupled to said input signal circuits and to said timing signal circuits and including a plurality of "and" and "or" networks connected in a particular interrelationship for response to said number timing signals and to successive input signals representing corresponding magnitudes in each of the numbers, algebraic comparison means coupled to said numerical comparison means and to said sign signal circuits and including a plurality of "and" and "or" networks connected in a particular interrelationship for response to signals from said numerical comparison means during the period of presentation of said number timing signals and for response to said sign signals during the period of presentation of said sign timing signals, an electrical storage device controllable between two electrical states and coupled to said algebraic comparison means and controlled by the output signals therefrom, said storage device being controlled by output signals from said numerical comparison means during the period of said number timing signals and being controlled in accordance with said sign signals during the period of said sign timing signal.

3. A comparator for serially receiving two pluralities of input signals representing the magnitudes of two algebraic numbers and representing the algebraic signs of the two numbers and for producing an output signal representing the relative algebraic magnitudes of the numbers, comprising: input signal circuits for serially presenting the input signals representing the magnitude of the numbers in the order of decreasing significance and for presenting the input signals representing the signs of the numbers, timing signal circuits presenting number timing signals during the period of presentation of the input signals representing the magnitudes of the numbers and presenting sign timing signals during the period of presentation of the input signals representing the signs of the numbers, sign signal circuits coupled to said input signal circuits and to said timing signal circuits for producing sign signals during the period of presentation of said sign timing signals, numerical comparison means coupled to said input signal circuits and said timing signal circuits and including a plurality of "and" and "or" networks connected in a particular interrelationship for response to said number timing signals and to successive input signals representing corresponding digits in each of the numbers, algebraic comparison means coupled to said numerical comparison means and to said sign signal circuits and including a plurality of "and" and "or" networks connected in a particular interrelationship for response to signals from said numerical comparison means during the period of presentation of said number timing signals and for response to said sign signals during the period of presentation of said sign timing signals, an electrical storage device controllable between two electrical states and coupled to said algebraic comparison means and controlled by signals therefrom, and means forming a part of said algebraic comparison means for inhibiting the production of output signals thereat upon the occurrence of differences in the input signals indicating differences in the magnitudes of the numbers at any digit position.

4. A comparator for serially receiving two pluralities of input signals representing the magnitudes of two algebraic numbers and representing the algebraic signs of the two numbers and for producing an output signal representing the relative algebraic magnitudes of the numbers, each plurality of signals sequentially indicating the absolute magnitude of the number and including at least one signal indicating the sign of the number, the combination comprising: input signal circuits for serially presenting the signals representing the magnitudes of the numbers and for presenting at least one input signal representing the signs of the numbers, timing signal circuits presenting number timing signals during the presentation of the input signals representing the magnitudes of the numbers and presenting sign timing signals during the presentation of the input signals representing the signs of the numbers, sign signal circuits coupled to said input signal circuits and to said timing signal circuits for producing sign signals during the period of said sign timing signals, numerical comparison means including a plurality of "and" and "or" networks connected in a particular interrelationship for response to said number timing signals and to successive input signals representing corresponding digits in each of the numbers, algebraic comparison means coupled to said numerical comparison means and to said sign signal circuits and including a plurality of "and" and "or" networks connected in a particular interrelationship for response to signals from said numerical comparison means during the period of said number timing signals and for response to said sign signals during the period of presentation of said sign timing signals and producing a first output signal upon the occurrence during the number timing signals of a signal from said numerical comparison means representing digits of greater magnitude for one input number than for the other input number or upon the occurrence of a first sign signal for a particular one of the input numbers during the presentation of the sign timing signal, and for the production of a second output signal upon the occurrence during the number timing signal of a signal from said numerical comparison means representing digits of a greater magnitude for said other input number than for said one input number or upon the occurrence of the first sign signal for said other input number during the presentation of the sign timing signal, and an electrical storage device controllable between two electrical states and coupled to said algebraic comparison means and controlled by output signals therefrom.

5. A comparator for serially receiving two pluralities of input signals representing the magnitudes of two algebraic numbers and representing the algebraic signs of the two numbers, wherein each of the pluralities of input signals indicate the complemented magnitude of the number for a negative value of the represented number, and for producing an output signal representing the relative algebraic magnitudes of the numbers, comprising: input signal circuits for serially presenting the input signals representing magnitudes of the numbers or complemented magnitudes of either or both of the numbers and input signals representing the signs of the numbers, timing signal circuits presenting number timing signals during the presentation of the input signals representing the numbers and for producing sign timing signals during the presentation of the input signals representing the signs of the numbers, sign signal circuits coupled to said input signal circuits and to said timing signal circuits for producing sign signals during the period of presentation of said sign timing signals, numerical comparison means connected to said input signal circuits and to said timing signal circuits and including a plurality of "and" and "or" networks connected in a particular interrelationship for response to said number timing signals and to successive input signals representing corresponding digits in each of the numbers, algebraic comparison means coupled to said numerical comparison means and to said sign signal circuits and including a plurality of "and" and "or" networks connected in a particular interrelationship for response to signals from said numerical comparison means during the period of said number timing signals and for response to said sign signals during the period of said sign timing signals, said algebraic comparison circuit producing a first output signal upon the simultaneous occurrence of signals representing digits of different magnitudes during the number timing signals, or upon the occurrence of sign signals representing number signs of opposite algebraic significance during the sign timing signals, an electrical storage device controllable between two electrical states and normally being in one of said two electrical states, said electrical storage device being coupled to said algebraic comparison means and being controlled to the other of said two electrical states by said first output signal, and electrical means coupled to said electrical storage device for applying a reset signal thereto to restore said device to said one electrical state.

6. A comparator for serially receiving two pluralities of input signals representing the magnitudes of two algebraic numbers and representing the algebraic signs of the two numbers and for producing an output signal representing the relative algebraic magnitudes of the numbers, comprising: input signal circuits for serially presenting the input signals representing the signs of the numbers and thereafter presenting the input signals representing the magnitude of the numbers in the order of decreasing significance, timing signal circuits presenting number timing signals during the period of presentation of the input signals representing the magnitudes of the numbers and presenting sign timing signals during the period of presentation of the input signals representing the signs of the numbers, sign signal circuits coupled to said input signal circuits and to said timing signal circuits for producing sign signals during the period of presentation of said sign timing signals, numerical comparison means coupled to said input signal circuits and said timing signal circuits and including a plurality of "and" and "or" networks connected in a particular interrelationship for response to said number timing signals and to successive input signals representing corresponding digits in each of the numbers, algebraic comparison means coupled to said numerical comparison means and to said sign signal circuits and including a plurality of "and" and "or" networks connected in a particular interrelationship for response to signals from said numerical comparison means during the period of presentation of said number timing signals and for response to said sign signals during the period of presentation of said sign timing signals, an electrical storage device controllable between two electrical states and coupled to said algebraic comparison means and controlled by signals therefrom, and means forming a part of said algebraic comparison means for inhibiting the production of signals by said algebraic comparison means in response to signals from said numerical control means during the period of said number timing signals and upon the occurrence of a particular interrelationship between the sign signals for the numbers during the period of presentation of said sign timing signals.

7. A serial comparator for receiving two series of input signals each having a plurality of sequential signals indicating the magnitude of the number and at least one signal indicating the sign of the number, including, means for providing first timing signals during the occurrence of the sequential signals representing the magnitudes of the input numbers and for providing second timing signals during the occurrence of the sign signals for the numbers, first comparison circuitry connected to the timing means for activation during the first timing signals and responsive to the sequential input signals during its activation to produce control signals in accordance with the occurrence of particular patterns in the successive input signals, and second comparison circuitry connected to the first comparison circuitry and to the timing means for the production of an output signal upon the occurrence of particular control signals during the first timing signals or upon the occurrence during the second timing signals of particular patterns of the signals representing the signs of the input numbers.

8. The comparator set forth in claim 7 in which the first comparison circuitry is connected to produce first control signals upon the simultaneous occurrence of input signals representing digits of opposite polarity for the input numbers during the first timing signals or upon the occurrence of the first control signals from one digital position and the simultaneous occurrence during the first timing signals of the first signal for one of the input numbers in the next digital position or of a signal representing an opposite polarity for the other input number in the next digital position and is connected to produce second control signals at other times during the first timing signals.

9. The comparator set forth in claim 8 in which the sequential input signals represent the absolute magnitudes of the input numbers and in which the second comparison circuitry is connected to produce a first output signal upon the occurrence of the first control signals during the first timing signals or upon the occurrence of sign signals of the first polarity for a particular one of the input numbers during the second timing signal and is connected to produce a second output signal upon the occurrence of second control signals during the first timing signals or upon the occurrence of sign signals of the particular polarity for the other input number during the second timing signals.

10. The comparator set forth in claim 8 in which the sequential input signals represent the complemented magnitudes of the input numbers and in which the second comparison circuitry is connected to produce a first output signal upon the occurrence during the first timing signals of signals representing digits of opposite polarity for the input numbers or upon the occurrence of signals representing signs of opposite polarities for the two input numbers during the second timing signals and is connected to produce a second output signal at other times.

11. A parallel comparator for receiving first and second pluralities of input signals each having a first plurality of signals indicating the magnitude of the number and at least one signal indicating the sign of the number and wherein each of the pluralities of input signals indicate the complemented magnitude of the number for a negative value of the represented number, including, a numerical comparator including a plurality of stages each connected to produce an output signal and each stage except the first including at least one "and" network and at least one "or" network connected to operate in a particular interrelationship for the production of a first output signal upon the occurrence of signals representing different values for the particular digits in the input numbers or upon the occurrence of a first output signal from the previous stage in the comparator and the occurrence of an input signal representing the first value for the particular digit of a first one of the input numbers or of an input signal representing an opposite value for the particular digit of the other input number, and a sign comparator including at least one "and" network and at least one "or" network and connected to the numerical comparator to receive the output signal from the comparator and connected to receive the signals representing the signs of the input numbers and connected to operate on the received signals in a particular interrelationship to produce a first output signal upon the occurrence of a signal representing a first comparison from the numerical comparator and a signal representing a first sign for the second input number or an opposite sign for the first input number, or upon the occurrence of signals representing a second comparison from the numerical comparator, the first sign for the second input number and the second sign for the first input number, said output signals of said sign comparator representing the comparison between the two input numbers.

12. An algebraic comparator for receiving two algebraic numbers A and B represented by two series of complementary numerical binary signals A, $\bar{A}$, and B, $\bar{B}$, respectively, and complementary sign binary signals $Sa$, $\bar{S}a$, and $Sb$, $\bar{S}b$, respectively, and producing an output signal corresponding to a signal $Ca$ representing the algebraic relative magnitudes of numbers A and B, said comparator comprising: numerical comparison means responsive to signals A, $\bar{A}$, B, and $\bar{B}$ for producing absolute magnitude signals corresponding to a signal $Cn$ representing the numerical relative magnitudes of algebraic numbers A and B; and algebraic comparison means coupled to said numerical comparison means and responsive to said $Cn$ signal and signals $Sa$, $\bar{S}a$, $Sb$, and $\bar{S}b$ for producing said output signal.

13. The algebraic comparator defined in claim 12 wherein the algebraic numbers A and B are in sign-absolute-magnitude representational form and wherein said signal $Ca$ is defined by the logical equation:

$$Ca = Cn.\bar{S}a + \bar{C}n.Sb$$

where the presence of a bar (−) over a signal indicates that it is the complement of the signal, and where a dot (.) represents the logical "and," and a plus (+) the logical "or."

14. The algebraic comparator defined in claim 12 wherein numbers A and B are in complemented-magnitude representational form and wherein said signal $Ca$ is defined by the logical equation:

$$Ca = Cn.(\bar{S}a + Sb) + \bar{C}n.\bar{S}a.Sb$$

where the presence of a bar (−) over a signal indicates that it is the complement of the signal, and where a dot (.) represents the logical "and," and a plus (+) the logical "or."

15. The algebraic comparator defined in claim 12 wherein said numerical comparison means produces an absolute magnitude signal $C_j$ for each corresponding binary-digit place of numbers A and B, the value of signal $C_j$ for the highest order binary-digit place representing signal $Cn$, each signal $C_j$ being produced as a function of corresponding numerical signals $A_j$, $B_j$, and a signal $C_{j-1}$ representing the value of signal $C_j$ for the next lower order binary-digit place, in accordance with the logical equation:

$$C_j = A_j.\bar{B}_j + C_{j-1}.(A_j + \bar{B}_j)$$

where the presence of a bar (−) over a signal indicates that it is the complement of the signal, and where a dot (.) represents the logical "and," and a plus (+) the logical "or."

16. The algebraic comparator defined in claim 12 wherein each of said series of numerical and sign signals are serially received by said comparator and wherein said comparator further includes a bistable output element having 1-setting and 0-setting input circuits $1Ca$ and $0Ca$, respectively, for assuming a final stable state representing signal $Ca$.

17. The algebraic comparator defined in claim 16 wherein the numbers A and B are received in sign-absolute-magnitude representational form and are received in the order of corresponding least significant numerical signals first and sign signals last, wherein input circuits $1Ca$ and $0Ca$ of said bistable element are responsive to absolute magnitude signals $A.\bar{B}$ and $\bar{A}.B$, respectively, for assuming a stable state representing signal $Cn$, wherein input circuits $1Ca$ and $0Ca$ are responsive to output signals $Sa$ and $Sb$, for assuming a final stable state representing signal $Ca$, and wherein said $1Ca$ and $0Ca$ input circuit signals are definable by the logical equations:

$$1Ca = A.\bar{B} + Sb$$
$$0Ca = \bar{A}.B + Sa$$

where the presence of a bar (−) over a signal indicates that it is the complement of the signal, and where a dot (.) represents the logical "and," and a plus (+) the logical "or."

18. The algebraic comparator defined in claim 16 wherein the algebraic numbers A and B are received in complemented-magnitude representational form and are received in the order of corresponding sign signals first and corresponding least significant numerical signals last, and wherein said algebraic comparison means includes inhibiting means responsive to absolute magnitude signals $\bar{A}.B$ and sign signals $Sa$ and $\bar{S}b$ for producing an inhibiting signal $I$ in accordance with the logical function:

$$I = \bar{A}.B + Sa\bar{S}b$$

where the presence of a bar (−) over a signal indicates that it is the complement of the signal, and where a dot (.) represents the logical "and," and a plus (+) the logical "or."

19. The algebraic comparator defined in claim 18 wherein said inhibit means includes a bistable storage element responsive to signal $I$ and producing complementary voltage-level signals $I$ and $\bar{I}$, and wherein said algebraic comparison means further includes an output means responsive to absolute magnitude signals $A.\bar{B}$, sign signals $\bar{S}a$ and $Sb$, and a reset signal $R$ for producing output signals $1Ca$ and $0Ca$ for application to said $1Ca$ and $0Ca$ input circuits, respectively, of said bistable output element, said output signals being produced in accordance with the logical equations:

$$1Ca = A.\bar{B}.\bar{I} + \bar{S}a.Sb$$
$$0Ca = R$$

where the presence of a bar (−) over a signal indicates that it is the complement of the signal, and where a dot (.) represents the logical "and," a plus (+) the logical "or."

References Cited in the file of this patent

UNITED STATES PATENTS

| | | |
|---|---|---|
| 2,364,540 | Luhn | Dec. 5, 1944 |
| 2,580,768 | Hamilton et al. | Jan. 1, 1952 |
| 2,648,829 | Ayres et al. | Aug. 11, 1953 |
| 2,700,755 | Burkhart | Jan. 25, 1955 |
| 2,776,418 | Townsend | Jan. 1, 1957 |